US009596635B2

United States Patent
Park et al.

(10) Patent No.: US 9,596,635 B2
(45) Date of Patent: Mar. 14, 2017

(54) METHOD AND APPARATUS FOR RELEASING DELAY TOLERANT ACCESS USER EQUIPMENT IN WIRELESS COMMUNICATION SYSTEM

(71) Applicant: LG Electronics Inc., Seoul (KR)

(72) Inventors: Kyung Min Park, Gyeonggi-do (KR); Jin Sook Ryu, Gyeonggi-do (KR); Jian Xu, Gyeonggi-do (KR); Young Dae Lee, Gyeonggi-do (KR); Sung Hoon Jung, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 226 days.

(21) Appl. No.: 14/354,645

(22) PCT Filed: Nov. 1, 2012

(86) PCT No.: PCT/KR2012/009125
§ 371 (c)(1),
(2) Date: Apr. 28, 2014

(87) PCT Pub. No.: WO2013/066074
PCT Pub. Date: May 10, 2013

(65) Prior Publication Data
US 2014/0293964 A1 Oct. 2, 2014

Related U.S. Application Data

(60) Provisional application No. 61/554,466, filed on Nov. 1, 2011.

(51) Int. Cl.
*H04W 4/00* (2009.01)
*H04W 36/08* (2009.01)
(Continued)

(52) U.S. Cl.
CPC ............. *H04W 36/08* (2013.01); *H04W 8/04* (2013.01); *H04W 76/06* (2013.01)

(58) Field of Classification Search
CPC ....................................................... H04W 80/04
(Continued)

(56) References Cited

U.S. PATENT DOCUMENTS

2009/0061876 A1* 3/2009 Ho ........................ H04W 99/00
455/436
2010/0265951 A1 10/2010 Fujita et al.
(Continued)

FOREIGN PATENT DOCUMENTS

WO 2009/080895 A2 7/2009
WO 2011/063825 A1 6/2011

OTHER PUBLICATIONS

International Search Report issued in corresponding International Patent Application No. PCT/KR2012/009125 dated Mar. 25, 2013.

*Primary Examiner* — Samina Choudhry
(74) *Attorney, Agent, or Firm* — Morgan, Lewis & Bockius LLP (57) ABSTRACT

A method and apparatus for releasing delay tolerant access user equipments (UEs) in a wireless communication system is provided. An eNodeB (eNB) receives an overload message or a user equipment (UE) context release command message including a request for releasing the delay tolerant access UEs from a mobility management entity (MME), releases the delay tolerant access UEs based on the overload message or the UE context release command message.

7 Claims, 9 Drawing Sheets

(51) Int. Cl.
*H04W 8/04* (2009.01)
*H04W 76/06* (2009.01)
(58) Field of Classification Search
USPC .......................................................... 370/331
See application file for complete search history.

(56) References Cited

U.S. PATENT DOCUMENTS

2011/0199898 A1* 8/2011 Cho ...................... H04W 48/06
370/230
2013/0015953 A1* 1/2013 Hsu ....................... H04W 4/005
340/7.46

* cited by examiner

METHOD AND APPARATUS FOR RELEASING DELAY TOLERANT ACCESS USER EQUIPMENT IN WIRELESS COMMUNICATION SYSTEM

BACKGROUND OF THE INVENTION

Field of the Invention

The present invention relates to wireless communication, and more particularly, to a method and apparatus for releasing delay tolerant access user equipments (UEs) in a wireless communication system.

Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Figure 1:
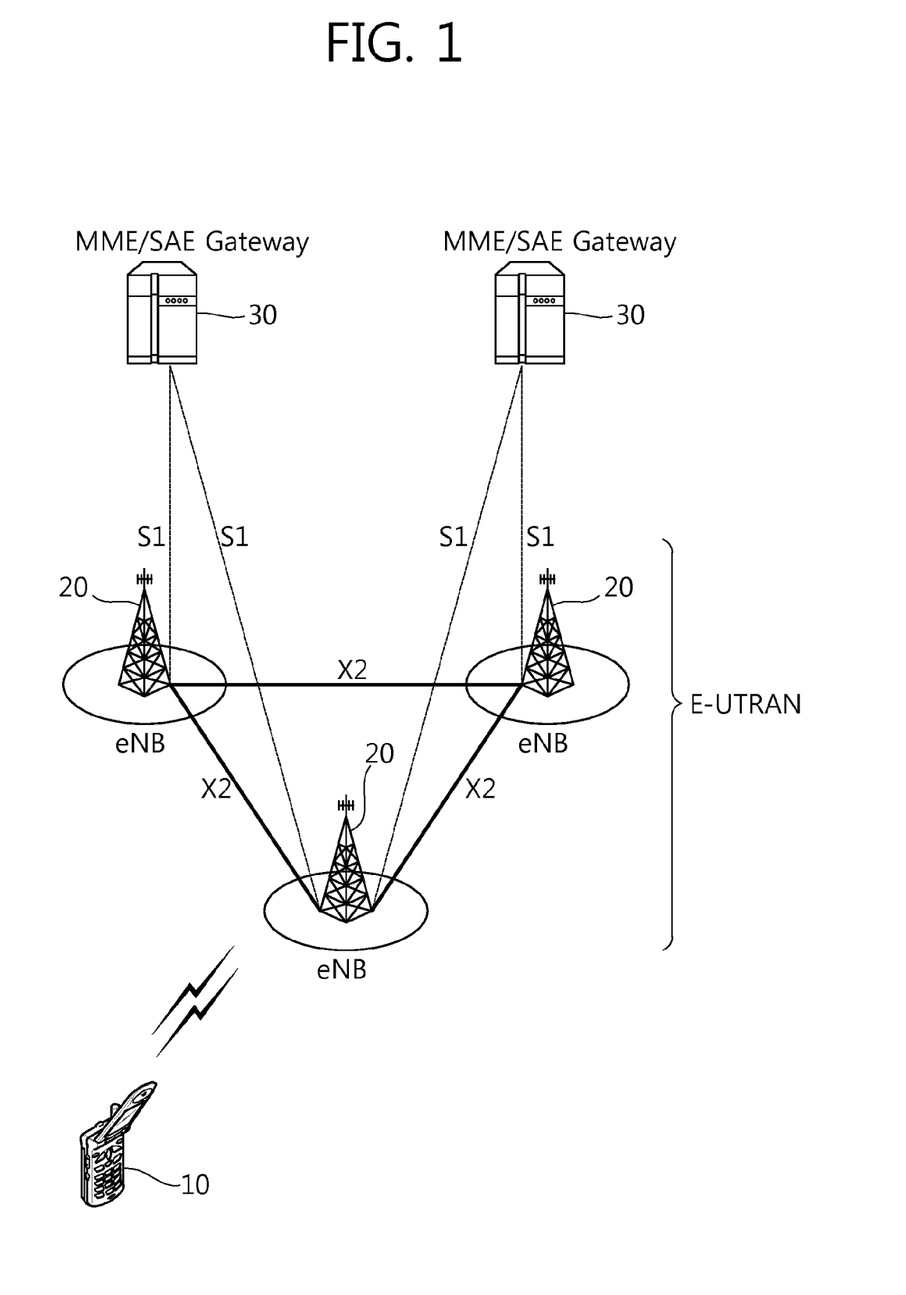
FIG. 1 shows network structure of an evolved universal mobile telecommunication system (E-UMTS). The E-UMTS may be also referred to as an LTE system.

FIG. 1 shows network structure of an evolved universal mobile telecommunication system (E-UMTS). The E-UMTS may be also referred to as an LTE system. The communication network is widely deployed to provide a variety of communication services such as voice over internet protocol (VoIP) through IMS and packet data.

As illustrated in FIG. 1, the E-UMTS network includes an evolved UMTS terrestrial radio access network (E-UTRAN), an evolved packet core (EPC) and one or more user equipment. The E-UTRAN may include one or more evolved NodeB (eNB) 20, and a plurality of user equipment (UE) 10. One or more E-UTRAN mobility management entity (MME)/system architecture evolution (SAE) gateways (S-GW) 30 may be positioned at the end of the network and connected to an external network.

As used herein, "downlink" refers to communication from eNB 20 to UE 10, and "uplink" refers to communication from the UE to an eNB. UE 10 refers to communication equipment carried by a user and may be also referred to as a mobile station (MS), a user terminal (UT), a subscriber station (SS) or a wireless device.

An eNB 20 provides end points of a user plane and a control plane to the UE 10. MME/S-GW 30 provides an end point of a session and mobility management function for UE 10. The eNB and MME/S-GW may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including non-access stratum (NAS) signaling to eNBs 20, NAS signaling security, access stratum (AS) security control, Inter core network (CN) node signaling for mobility between 3GPP access networks, Idle mode UE reachability (including control and execution of paging retransmission), tracking area list management (for UE in idle and active mode), packet data network (PDN) GW and serving GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g. deep packet inspection), lawful interception, UE internet protocol (IP) address allocation, transport level packet marking in the downlink, UL and DL service level charging, gating and rate enforcement, DL rate enforcement based on APN-AMBR. For clarity MME/S-GW 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

Figure 2:
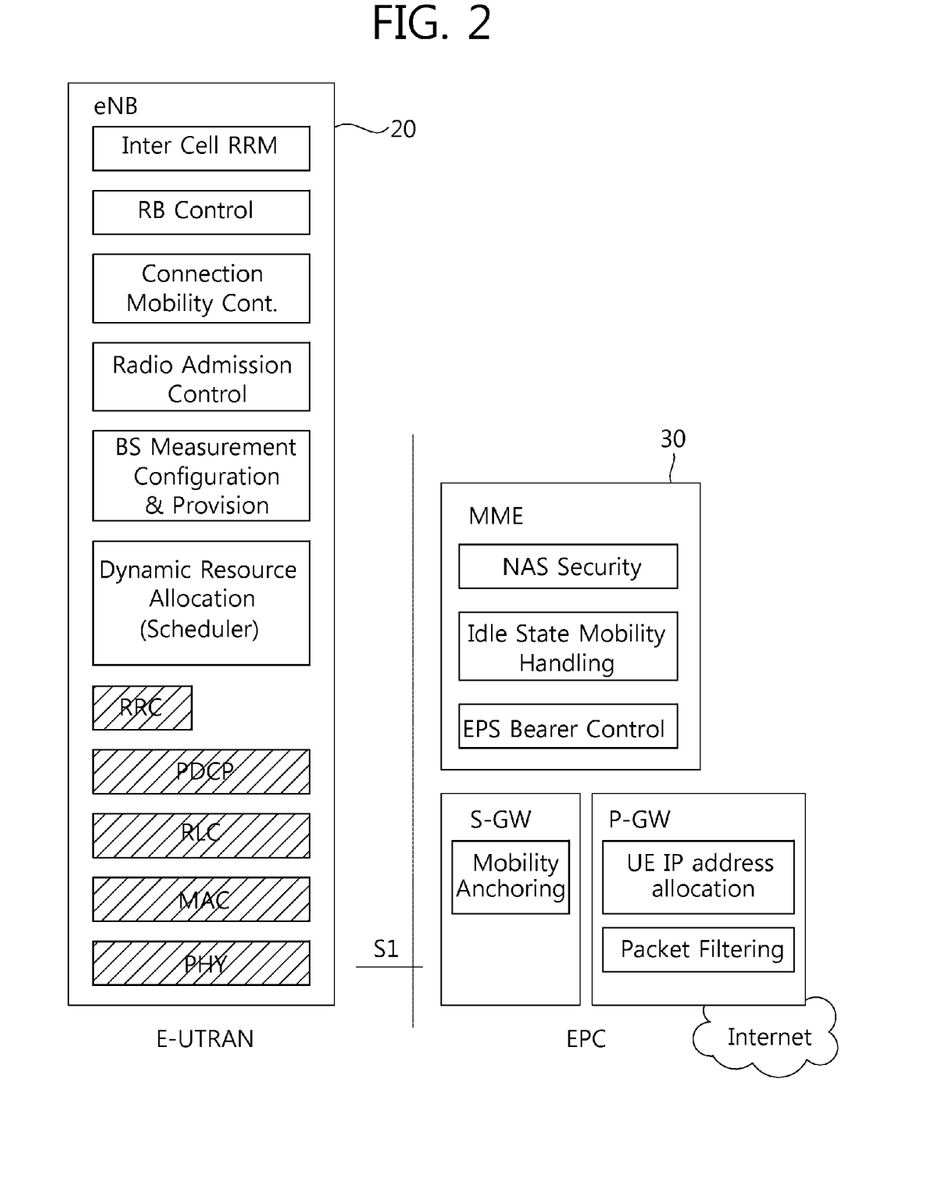
FIG. 2 shows architecture of a typical E-UTRAN and a typical EPC.

FIG. 2 shows architecture of a typical E-UTRAN and a typical EPC.

As illustrated, eNB 20 may perform functions of selection for gateway 30, routing toward the gateway during a radio resource control (RRC) activation, scheduling and transmitting of paging messages, scheduling and transmitting of broadcast channel (BCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
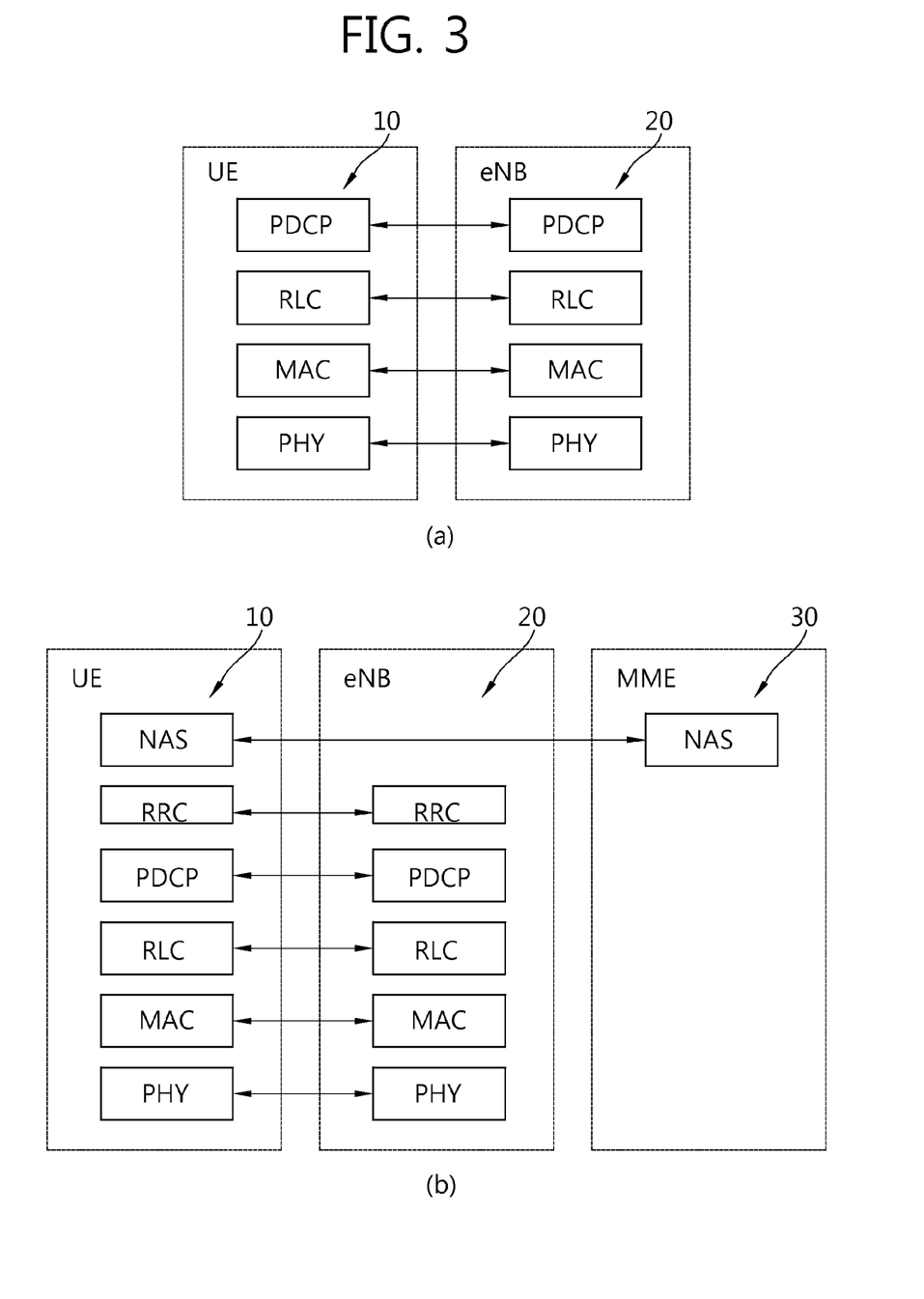
FIG. 3 shows a user-plane protocol and a control-plane protocol stack for the E-UMTS.

FIG. 3 shows a user-plane protocol and a control-plane protocol stack for the E-UMTS.

FIG. 3(a) is block diagram depicting the user-plane protocol, and FIG. 3(b) is block diagram depicting the control-plane protocol. As illustrated, the protocol layers may be divided into a first layer (L1), a second layer (L2) and a third layer (L3) based upon the three lower layers of an open system interconnection (OSI) standard model that is well known in the art of communication systems.

The physical layer, the L1, provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of the L2 provides services to a radio link control (RLC) layer (which is a higher layer) via a logical channel. The RLC layer of the L2 supports the transmission of data with reliability. It should be noted that the RLC layer illustrated in FIGS. 3(a) and 3(b) is depicted because if the RLC functions are implemented in and performed by the MAC layer, the RLC layer itself is not required. A packet data convergence protocol (PDCP) layer of the L2 performs a header compression function that reduces unnecessary control information such that data being transmitted by employing IP packets, such as IPv4 or IPv6, can be efficiently sent over a radio (wireless) interface that has a relatively small bandwidth.

A radio resource control (RRC) layer located at the lowest portion of the L3 is only defined in the control plane and controls logical channels, transport channels and the physical channels in relation to the configuration, reconfiguration, and release of the radio bearers (RBs). Here, the RB signifies a service provided by the L2 for data transmission between the terminal and the UTRAN.

As illustrated in FIG. 3(a), the RLC and MAC layers (terminated in an eNB 20 on the network side) may perform functions such as scheduling, automatic repeat request (ARQ), and hybrid automatic repeat request (HARQ). The PDCP layer (terminated in eNB 20 on the network side) may perform the user plane functions such as header compression, integrity protection, and ciphering.

As illustrated in FIG. 3(b), the RLC and MAC layers (terminated in an eNodeB 20 on the network side) perform the same functions for the control plane. As illustrated, the RRC layer (terminated in an eNB 20 on the network side) may perform functions such as broadcasting, paging, RRC connection management, RB control, mobility functions, and UE measurement reporting and controlling. The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The RRC state may be divided into two different states such as a RRC_IDLE and a RRC_CONNECTED. In RRC_IDLE state, the UE 10 may receive broadcasts of system information and paging information while the UE specifies a discontinuous reception (DRX) configured by NAS, and the UE has been allocated an identification (ID) which uniquely identifies the UE in a tracking area and may perform PLMN selection and cell re-selection. Also, in RRC_IDLE state, no RRC context is stored in the eNB.

In RRC_CONNECTED state, the UE 10 has an E-UTRAN RRC connection and a context in the E-UTRAN, such that transmitting and/or receiving data to/from the network (eNB) becomes possible. Also, the UE 10 can report channel quality information and feedback information to the eNB.

In RRC_CONNECTED state, the E-UTRAN knows the cell to which the UE 10 belongs. Therefore, the network can transmit and/or receive data to/from UE 10, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE 10 specifies the paging DRX cycle. Specifically, the UE 10 monitors a paging signal at a specific paging occasion of every UE specific paging DRX cycle.

The paging occasion is a time interval during which a paging signal is transmitted. The UE 10 has its own paging occasion.

A paging message is transmitted over all cells belonging to the same tracking area. If the UE 10 moves from one tracking area to another tracking area, the UE will send a tracking area update message to the network to update its location.

Figure 4:
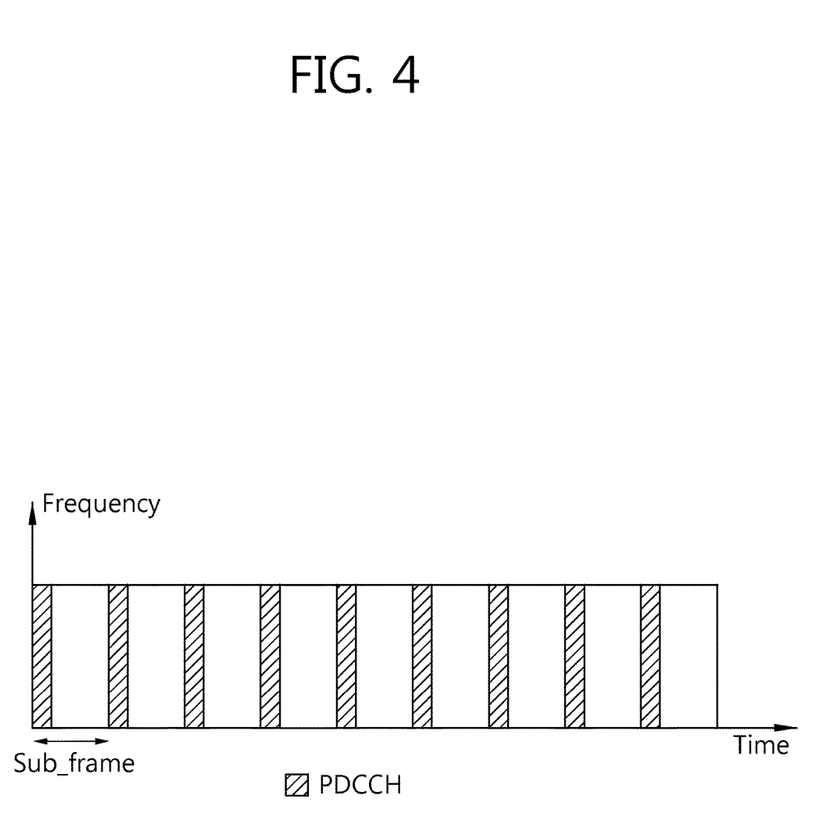
FIG. 4 shows an example of structure of a physical channel.

FIG. 4 shows an example of structure of a physical channel.

The physical channel transfers signaling and data between layer L1 of a UE and eNB. As illustrated in FIG. 4, the physical channel transfers the signaling and data with a radio resource, which consists of one or more sub-carriers in frequency and one more symbols in time.

One sub-frame, which is 1 ms in length, consists of several symbols. The particular symbol(s) of the sub-frame, such as the first symbol of the sub-frame, can be used for downlink control channel (PDCCH). PDCCHs carry dynamic allocated resources, such as PRBs and modulation and coding scheme (MCS).

A transport channel transfers signaling and data between the L1 and MAC layers. A physical channel is mapped to a transport channel.

Downlink transport channel types include a broadcast channel (BCH), a downlink shared channel (DL-SCH), a paging channel (PCH) and a multicast channel (MCH). The BCH is used for transmitting system information. The DL-SCH supports HARQ, dynamic link adaptation by varying the modulation, coding and transmit power, and both dynamic and semi-static resource allocation. The DL-SCH also may enable broadcast in the entire cell and the use of beamforming. The PCH is used for paging a UE. The MCH is used for multicast or broadcast service transmission.

Uplink transport channel types include an uplink shared channel (UL-SCH) and random access channel(s) (RACH). The UL-SCH supports HARQ and dynamic link adaptation by varying the transmit power and potentially modulation and coding. The UL-SCH also may enable the use of beamforming. The RACH is normally used for initial access to a cell.

The MAC sublayer provides data transfer services on logical channels. A set of logical channel types is defined for different data transfer services offered by MAC. Each logical channel type is defined according to the type of information transferred.

Logical channels are generally classified into two groups. The two groups are control channels for the transfer of control plane information and traffic channels for the transfer of user plane information.

Control channels are used for transfer of control plane information only. The control channels provided by MAC include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by MAC include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include a DCCH that can be mapped to UL-SCH, a DTCH that can be mapped to UL-SCH and a CCCH that can be mapped to UL-SCH. Downlink connections between logical channels and transport channels include a BCCH that can be mapped to BCH or DL-SCH, a PCCH that can be mapped to PCH, a DCCH that can be mapped to DL-SCH, and a DTCH that can be mapped to DL-SCH, a MCCH that can be mapped to MCH, and a MTCH that can be mapped to MCH.

Machine-type communication (MTC) is one type of data communication including one or more entities that do not require an interaction with a human being. That is, MTC refers to a concept in which a machine device not a mobile station (MS) that is used by a human being performs communication using the existing network, such as the GSM, the UMTS, or the LTE. A machine device used in MTC may be called an MTC device, and the MTC device includes various devices, such as a vending machine and a machine for measuring the water level of a dam. That is, MTC may be widely applied to a variety of fields. Since an MTC device has a different feature from a common MS, and thus services optimized for MTC may be different from services optimized for human to human communication. MTC may be characterized in different market scenarios, data communication, small costs and efforts, a very large number of potential communication terminals, a wide service area, and low traffic per MS, as compared with the present mobile network communication service.

The number of MTC devices is expected to be much greater than the number of legacy devices, and a probability of performing operations of the plurality of MTC devices simultaneously is high due to features of a typical machine-to-machine (M2M) service. Therefore, there is a possibility that a network resource is not enough, and thus a method of effectively handling a network signaling load for the MTC device is very important. Accordingly, overload control for handling an overload in core network signaling and radio access network (RAN) signaling has been recently emerged as the most important issue in the MTC.

Meanwhile, the MTC device may support a feature of delay tolerant access. Accordingly, even if the transmission of data by the M2M device is delayed some extent, it may be not a big problem. In addition, according to a characteristic of the M2M service, it is expected that the M2M device transmits small-size data for relatively short period of time.

Currently, there is no signaling procedure that a mobility management entity (MME) requests an eNodeB (eNB) to release delay tolerant access UEs.

SUMMARY OF THE INVENTION

The present invention provides a method and apparatus for releasing delay tolerant access user equipments (UEs) in a wireless communication system. The present invention provides a method for an MME requesting an eNB to release delay tolerant access UEs, and notifying the eNB whether each UE supports delay tolerant access or not.

In an aspect, a method for releasing, by a eNodeB (eNB), delay tolerant access user equipments (UEs) in a wireless communication system is provided. The method includes receiving a message including a request for releasing the delay tolerant access UEs from a mobility management entity (MME), and releasing the delay tolerant access UEs based on the message.

The message may further include lists of the delay tolerant access UEs.

The message may be an overload start message received through an S1 interface.

The message may be a UE context release command message received through an S1 interface.

In another aspect, a method for transmitting, by a mobility management entity (MME), a message in a wireless communication system is provided. The method includes transmitting the message including a request for releasing delay tolerant access user equipment (UEs) to an eNodeB (eNB).

In another aspect, a method for performing, by a source mobility management entity (MME), an S1-based handover procedure in a wireless communication system is provided. The method includes receiving a handover required message from a source eNodeB (eNB), transmitting a forward relocation request message to a target MME, the forward relocation request message including information about whether a user equipment (UE) supports delay tolerant access or not, receiving a forward relocation response message from the target MME in response to the forward relocation request message, and transmitting a handover command message to the source eNB.

Delay tolerant access UEs can be released efficiently.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 5:
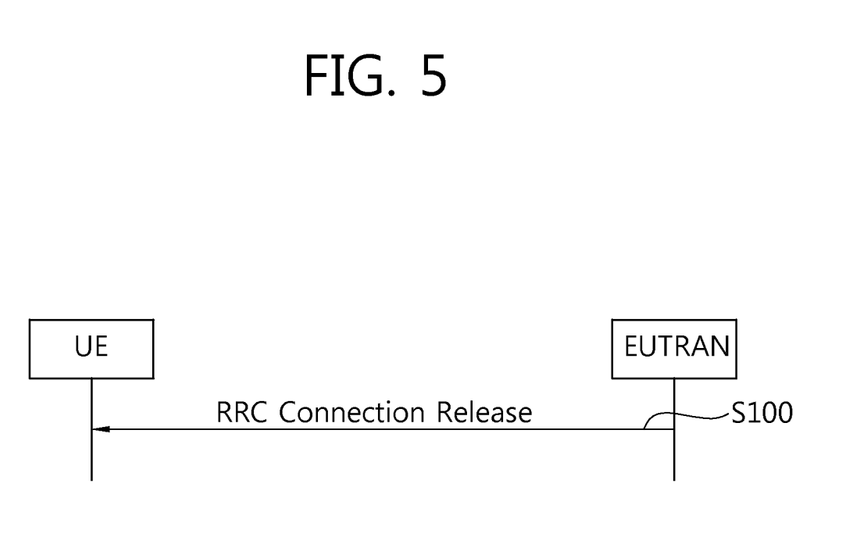
FIG. 5 shows an example of transmitting a radio resource control (RRC) release message.

FIG. 5 shows an example of transmitting a radio resource control (RRC) release message.

At step S100, a base station transmits an RRC connection release message to a user equipment. The RRC connection release message is used to command the release of an RRC connection. The purpose of the RRC connection release is to release the RRC connection, which includes release of established radio bearers as well as all radio resources. The RRC connection release message may be transmitted through a dedicated control channel (DCCH). The RRC connection release message may include a parameter 'extended wait time'. The parameter 'extended wait time' indicates a value in seconds for wait time for delay tolerant access requests. That is, the parameter 'extend wait time' of the UE is used for reducing traffic overload in a mobility management entity (MME). It means that the RRC connection release message including the parameter 'extended wait time' is caused by the MME.

However, currently there is no S1 interface signaling procedure that the MME requests the eNB to release delay tolerant access UEs. For example, an overload start message, which is described in a paragraph 8.7.6 of 3GPP TS 36.413 V10.3.0 (2011-09), does not contain an RRC connection release of delay tolerant access UEs as the action the eNB needs to take. Also, a cause value included in a UE context release command message, which is described in a paragraph 8.3.3 of 3GPP TS 36.413 V10.3.0 (2011-09), does not contain releasing delay tolerant access UEs as well.

Moreover, the eNB has no way to recognize the UE to support delay tolerant access. Even though the eNB receives an establishment cause value containing delay tolerant access information for the UE when the UE performs RRC connection procedure, it is not expected that the eNB keeps this information for a long time. Even if it is assumed that the eNB keeps this information, it is not transferred to a target eNB in a handover procedure, and consequently the target eNB does not know whether the UE supports delay tolerant access or not.

Therefore, a method that the MME requests the eNB to release delay tolerant access UEs and notifies the eNB whether each UE supports delay tolerant access or not may be proposed. An embodiment of the present invention may provide a method of using an overload start message or a UE context release command message. In following methods, when the eNB releases delay tolerant access UEs, the eNB allocates the parameter 'extended wait time' to UEs as well.

Figure 6:
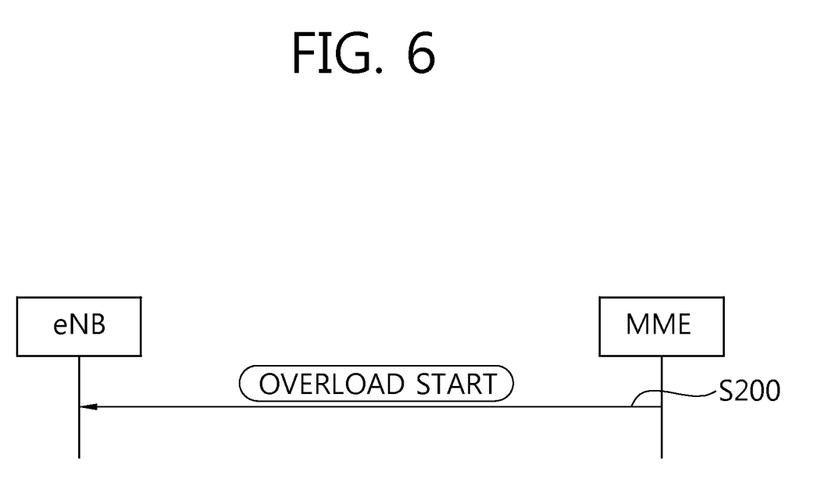
FIG. 6 shows an example of transmitting an overload start message according to an embodiment of the present invention.

FIG. 6 shows an example of transmitting an overload start message according to an embodiment of the present invention.

At step S200, an MME transmits an overload start message to an eNB through an S1 interface.

The purpose of an overload start procedure is to inform the eNB to reduce signaling load towards the MME. This procedure uses non-UE associated signaling. The eNB receiving the overload start message shall assume the MME from which it receives the overload start message as being in an overloaded state. If an overload action is ongoing and the eNB receives a further overload start message, the eNB shall replace the ongoing overload action with the newly requested one.

The overload start message may include overload action IE (information element). The overload action IE indicates which signaling traffic is subject to rejection by the eNB in an MME overload situation. Table 1 shows an example of the overload action IE.

TABLE 1

| IE/Group Name | Presence | Range | IE type and reference | Semantics description |
|---|---|---|---|---|
| Overload Action | M | | ENUMERATED (Reject RRC connection establishments for non-emergency MO DT, Reject RRC connection establishments for Signalling, Permit Emergency Sessions and mobile terminated services only, . . . , Permit High Priority Sessions and mobile terminated services only, Reject delay tolerant access) | |

Referring to Table 1, if the overload action IE is set to 'Reject delay tolerant access', and if traffic load reduction indication IE is included in the overload start message and if supported, the eNB may reduce the signaling traffic indicated as to be rejected.

According to an embodiment of the present invention, the eNB may interpret 'Reject delay tolerant access' in the overload action IE included in the overload start message as rejecting further delay tolerant access UEs and releasing current delay tolerant access UEs. That is, if the overload action IE includes 'Reject delay tolerant access', then lists of UEs supporting delay tolerant access may be added to the overload start message. It is possible to understand as one of other elements in the overload action IE also includes a command that the eNB shall release current delay tolerant access UEs.

Or, new element 'Release delay tolerant access' may be added in the overload action IE included in the overload start message, which means that the eNB should release current delay tolerant access UEs. If the overload action IE includes 'Release delay tolerant access', then lists of UEs supporting delay tolerant access may be added to the overload start message.

Figure 7:
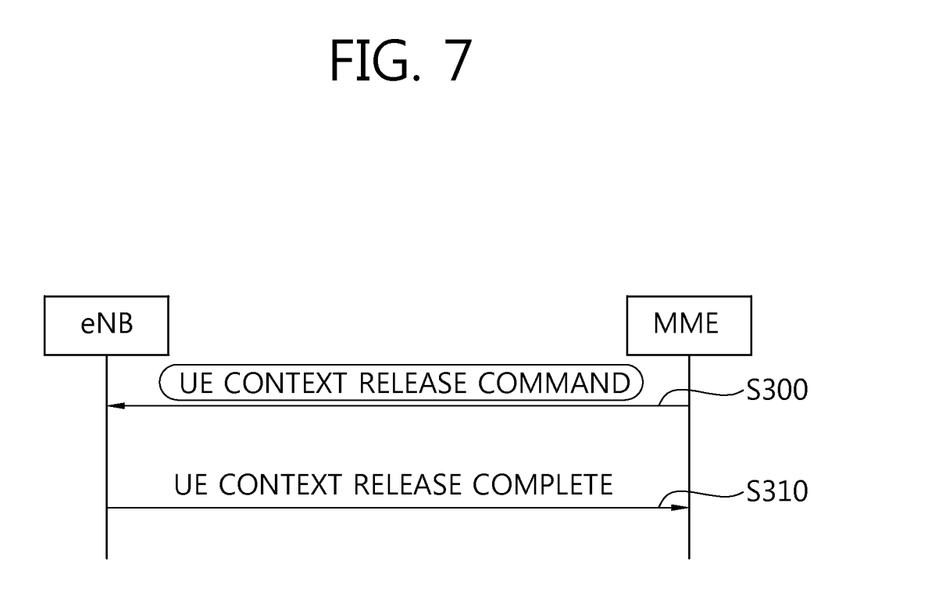
FIG. 7 shows an example of transmitting a UE context release command message according to an embodiment of the present invention.

FIG. 7 shows an example of transmitting a UE context release command message according to an embodiment of the present invention.

At step S300, an MME transmits a UE context release command message to an eNB through an S1 interface.

The purpose of a UE context release procedure is to enable the MME to order a release of UE-associated logical connection due to various reasons. For example, the various reason may include completion of a transaction between the UE and the EPC, or completion of successful handover, or completion of handover cancellation, or release of old UE-associated logical S1-connection when two UE-associated logical S1-connections toward the same UE is detected after the UE has initiated the establishment of a new UE-associated logical S1-connection, or the UE is no longer allowed to access closes subscriber group (CSG) cell (i.e., the UE becomes a non-member of the currently used CSG cell). This procedure uses UE-associated S1 connection.

The MME initiates the UE context release procedure by transmitting the UE context release command message to the eNB. Upon reception of the UE context release command message, the eNB shall release all related signaling and user data transport resources. Table 2 shows an example of the UE context release command message.

TABLE 2

| IE/Group Name | Presence | Range | IE type and reference | Semantics description | Criticality | Assigned Criticality |
|---|---|---|---|---|---|---|
| Message Type | M | | 9.2.1.1 | | YES | reject |
| CHOICE UE S1AP IDs | M | | | | YES | reject |
| >UE S1AP ID pair | M | | 9.2.3.18 | | | |
| >MME UE S1AP ID | M | | 9.2.3.3 | | | |
| Cause | M | | 9.2.1.3 | | YES | ignore |

Referring to Table 2, the UE context release command message includes cause IE. The cause IE indicates a reason for a particular event for an S1AP protocol. Table 3 shows an example of the cause IE.

TABLE 3

| IE/Group Name | Presence | Range | IE Type and Reference | Semantics Description |
|---|---|---|---|---|
| CHOICE Cause Group >Radio Network Layer | M | | | |
| >>Radio Network Layer Cause | M | | ENUMERATED (Unspecified, $TX2_{RELOCOverall}$ Expiry, Successful Handover, Release due to E-UTRAN Generated Reason, Handover Cancelled, Partial Handover, Handover Failure In Target EPC/eNB Or Target System, Handover Target not allowed, $TS1_{RELOCoverall}$ Expiry, $TS1_{RELOCprep}$ Expiry, Cell not available, Unknown Target ID, No Radio Resources Available in Target Cell, Unknown or already allocated MME UE S1AP ID, Unknown or already allocated eNB UE S1AP ID, Unknown or inconsistent pair of UE S1AP ID, Handover desirable for radio reasons, Time critical handover, Resource optimisation handover, Reduce load in serving cell, User inactivity, Radio Connection With UE Lost, Load Balancing TAU Required, CS Fallback Triggered, UE Not Available For PS Service, Radio resources not available, Failure in the Radio Interface Procedure, Invalid QoS combination, Inter-RAT redirection, Interaction with other procedure, Unknown E-RAB ID, Multiple E-RAB ID instances, Encryption and/or integrity protection algorithms not supported, S1 intra system | |

TABLE 3-continued

| IE/Group Name | Presence | Range | IE Type and Reference | Semantics Description |
|---|---|---|---|---|
| | | | Handover triggered, S1 inter system Handover triggered, X2 Handover triggered . . . , Redirection towards 1xRTT, Not supported QCI value, invalid CSG Id) | |
| >Transport Layer | | | | |
| >>Transport Layer Cause | M | | ENUMERATED (Transport Resource Unavailable, Unspecified, . . .) | |
| >NAS | | | | |
| >>NAS Cause | M | | ENUMERATED (Normal Release, Authentication failure, Detach, Unspecified, . . . , CSG Subscription Expiry) | |
| >Protocol | | | | |
| >>Protocol Cause | M | | ENUMERATED (Transfer Syntax Error, Abstract Syntax Error (Reject), Abstract Syntax Error (Ignore and Notify), Message not Compatible with Receiver State, Semantic Error, Abstract Syntax Error (Falsely Constructed Message), Unspecified, . . .) | |
| >Misc | | | | |
| >>Miscellaneous Cause | M | | ENUMERATED (Control Processing Overload, Not enough User Plane Processing Resources, Hardware Failure, O&M Intervention, Unspecified, Unknown PLMN, . . .) | |

According to an embodiment of the present invention, the eNB may understand as one of the elements (e.g. 'Control Processing Overload') in the cause IE of the UE context release command message includes a command that the eNB should release current delay tolerant access UEs. If the cause IE includes this element, then lists of UEs supporting delay tolerant access may be added to the UE context release command message.

Or, new element 'Release delay tolerant access' may be added in the cause IE included in the UE context release command message, which means that the eNB should release current delay tolerant access UEs. If the cause IE includes 'Release delay tolerant access', then lists of UEs supporting delay tolerant access may be added to the UE context release command message.

At step S310, the eNB transmits a UE context release complete message to the MME in response to the UE context release command message.

Additionally, when the UE performs an S1 interface based handover with MME relocation, a method for a serving MME notifying a target MME whether the UE supports delay tolerant access or not may be proposed. It makes the target eNB receive this information when the target MME commands that target eNB should release delay tolerant access UEs.

Figure 8:
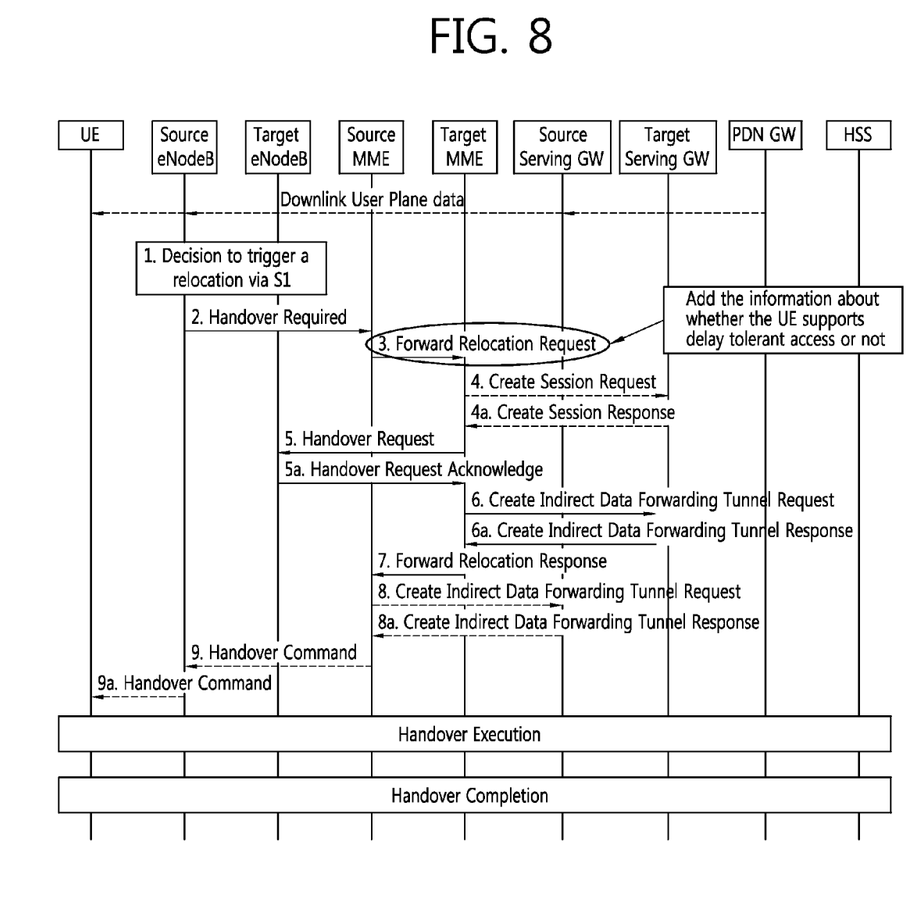
FIG. 8 shows an example of an S1-based handover procedure according to an embodiment of the present invention.

FIG. 8 shows an example of an S1-based handover procedure according to an embodiment of the present invention.

1. The source eNB decides to initiate an S1-based handover to the target eNB. This can be triggered e.g. by no X2 connectivity to the target eNB, or by an error indication from the target eNB after an unsuccessful X2-based handover, or by dynamic information learnt by the source eNB.

2. The source eNB transmits a handover required message to the source MME.

3. The source MME selects the target MME on "MME selection function" and if the source MME has determined to relocate the MME, the source MME transmits a forward relocation request message to the target MME.

According to an embodiment of the present invention, the forward relocation request message may include information about whether the UE supports delay tolerant access or not. Therefore, the target MME may know whether the UE performing the S1-based handover procedure supports delay tolerant access or not.

4. If the MME has been relocated, the target MME verifies whether the source serving GW can continue to serve the UE. If not, it selects a new serving GW. If the MME has not been relocated, the source MME decides on this serving GW re-selection.

If the source serving GW continues to serve the UE, no message is transmitted. In this case, the target serving GW is identical to the source serving GW. If a new serving GW is selected, the target MME transmits a create session request message per PDN connection to the target serving GW. The target serving GW may transmit a create session response message to the source serving GW in response to the create session request message.

5. The Target MME transmits a handover request message to the target eNB. The handover request message creates a UE context in the target eNB, including information about bearers, and security context. The target eNB transmits a handover request acknowledge message to the target MME in response to the handover request message.

6. If indirect forwarding applies and the serving GW is relocated, the target MME may set up forwarding parameters by transmitting a create indirect data forwarding tunnel request message to the serving GW. The serving GW may transmit a create indirect data forwarding tunnel response message to the target MME in response to the create indirect data forwarding tunnel request message.

7. If the MME has been relocated, the target MME transmits a forward relocation response message to the source MME.

8. If indirect forwarding applies, the source MME may transmit a create indirect data forwarding tunnel request message to the serving GW. The serving GW responds with a create indirect data forwarding tunnel response message to the source MME.

9. The source MME transmits a handover command message to the source eNB. The handover command is transmitted to the UE. Upon reception of handover command message, the UE will remove any EPS bearers for which it did not receive the corresponding EPS radio bearers in the target cell.

The procedures described above correspond to a handover preparation procedure. After the handover preparation procedure, a handover execution procedure and a handover completion procedure are performed.

Figure 9:
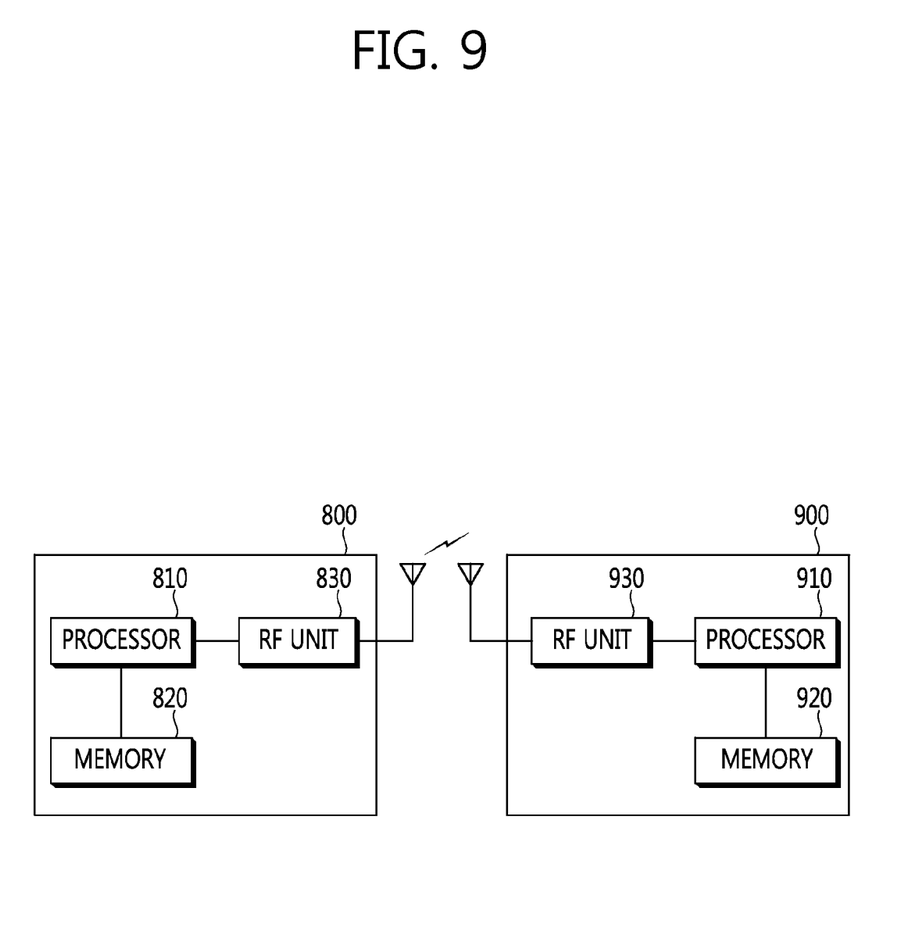
FIG. 9 is a block diagram showing wireless communication system to implement an embodiment of the present invention.

FIG. 9 is a block diagram showing wireless communication system to implement an embodiment of the present invention.

An eNB 800 includes a processor 810, a memory 820, and an RF (radio frequency) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

An MME 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for releasing, by an eNodeB (eNB), delay tolerant access user equipments (UEs) in a wireless communication system, the method comprising:
receiving a message including:
a request for releasing the delay tolerant access UEs from a mobility management entity (MME), the message being an overload start message or a UE context release command message received through an S1 interface; and
one or more lists of UEs supporting the delay tolerant access; and
releasing the delay tolerant access UEs based on the message,
wherein the request for releasing the delay tolerant access UEs is included in a cause IE (information element) in the UE context release command message, and
wherein the request for releasing the delay tolerant access UEs corresponds to a newly added "Release delay tolerant access" included in the cause IE.

2. The method of claim 1, wherein the request for releasing the delay tolerant access UEs is included in an overload action IE (information element) in the overload start message.

3. The method of claim 2, wherein the request for releasing the delay tolerant access UEs corresponds to a "Reject delay tolerant access" parameter included in the overload action IE.

4. The method of claim 2, wherein the request for releasing the delay tolerant access UEs corresponds to a newly added "Release delay tolerant access" included in the overload action IE.

5. The method of claim 1, wherein the request for releasing the delay tolerant access UEs corresponds to at least one parameter included in the cause IE.

6. The method of claim 1, further comprising transmitting a UE context release complete message to the MME in response to the UE context release command message.

7. A method for transmitting, by a mobility management entity (MME), a message in a wireless communication system, the method comprising:
transmitting the message including:
a request for releasing at least one delay tolerant access user equipment (UE) to an eNodeB (eNB), the message being an overload start message or a UE context release command message transmitted through an S1 interface; and
one or more lists of UEs supporting the delay tolerant access,
wherein the at least one delay tolerant access UE is released based on the message, wherein the request for releasing the delay tolerant access UEs is included in a cause IE (information element) in the UE context release command message, and wherein the request for releasing the delay tolerant access UEs corresponds to a newly added "Release delay tolerant access" included in the cause IE.

* * * * *